Nov. 14, 1939.  G. H. GREEN  2,179,888

JACK SINKER

Filed Aug. 18, 1937

*Inventor*
George Henry Green,

*Attorneys*

Patented Nov. 14, 1939

2,179,888

UNITED STATES PATENT OFFICE 2,179,888

JACK SINKER

George Henry Green, Leicester, England

Application August 18, 1937, Serial No. 159,760
In Great Britain August 20, 1936

3 Claims. (Cl. 66—110)

This invention comprises improvements in jack sinkers for the Cottons patent type of knitting machines and laminated parts of similar construction, and in the method of manufacturing such parts and has for its principal object the provision of an improved type of jack sinker for knitting machines of the type referred to, which will have a longer life in the machine than a jack sinker as hitherto constructed and manufactured.

As is well known in the sinker-making art, it is customary to form a jack sinker as above from a stamped out portion of thin high grade carbon steel and at the rear end of this portion at each side thereof a suitably shaped stamping of comparatively soft sheet steel is secured to reinforce the rear end of the sinker and provide a thickened portion capable of withstanding the striking action of the machine jacks. Hitherto it has been customary to secure the three laminae of sheet metal constituting the rear end of the sinker, by piercing or drilling holes in the said laminae, passing copper or other metal rivets therethrough and stamping or riveting over the extremities of the said rivets, the outer edges of the holes provided in the mild steel side plates being slightly countersunk to receive the spread heads of the said rivets.

Whilst the above construction of jack sinker may be regarded as fairly satisfactory it has the disadvantage that after a certain varying life in the machine, depending to some extent on the adjustment of the machine, the rivets become loose or broken and/or the central sinker blade breaks across one or more of the rivet holes, and the sinker must be replaced. Further the method of manufacturing a sinker of the construction above described entails a considerable number of critical operations and makes the cost of the sinker comparatively high.

In addition to providing an improved jack sinker which will offer much greater resistance to breakage or becoming dis-assembled, it is a further object of the invention to provide a method of manufacturing a jack sinker or similar laminated member or part which is considerably cheaper and quicker than the method referred to above.

In accordance with the present invention, the above objects are attained by uniting the component parts of the sinker or the like by the process of spot welding. In view of the fact, however, that the central lamina or shaped sinker blade is composed of high grade carbon steel, the problem of spot welding the several laminae is no simple matter since it has long been known to be impracticable to weld high grade carbon steel by the resistance electric welding process, as the fusing heat generated during the welding process and the subsequent rapid cooling invariably crystallizes and causes disintegration of this class of steel. If, therefore, the three laminae of a jack sinker are simply welded by spot welding the two other mild steel laminae will be secured to the carbon steel central laminae only by thin films of extremely brittle metal and will quickly become separated during the working of the sinker.

According to the present invention a jack sinker for Cottons patent type of knitting machine, or other similar laminated parts, is formed from three or more laminae or plate-like parts, one or more of the central laminae of which is or are pierced or drilled through, whilst one or more of the outer laminae is or are stamped or otherwise indented to form projecting elements which enter or pass through the holes in the said central pierced lamina and the outer laminae are homogeneously secured together by spot welding at the positions where the said outer lamina or laminae is or are stamped to coact with the holes in the central lamina or laminae.

Figure 1:
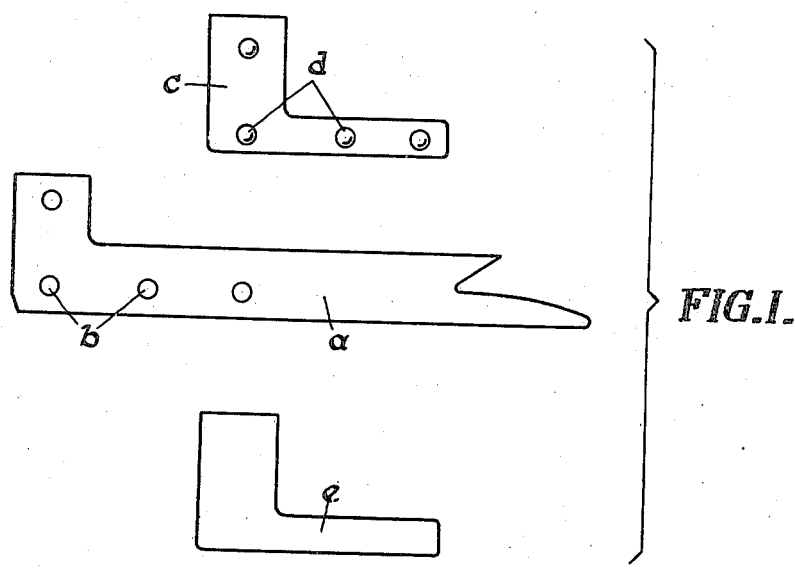
Fig. 1 shows the component parts of a jack sinker according to one embodiment of this invention, the parts being shown prepared for assembly.
Figure 2:
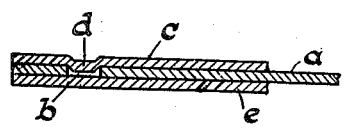
Fig. 2 is a sectional detail, enlarged, showing the parts assembled ready for welding.
Figure 3:
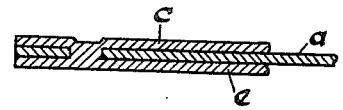
Fig. 3 is a similar view to Fig. 2 showing the parts when welded.

Referring to Fig. 1, the sinker blade $a$ constituting the central lamina is pierced or drilled to provide a plurality of holes $b$, say four, in the rear part thereof, and one lamina $c$ of the two side laminae is stamped or otherwise indented to produce small protuberances $d$ at positions on the said side lamina corresponding to the positions of the holes $b$ in the central lamina $a$. The stamping of the said side lamina $c$ is such that when the side lamina is assembled in position with the central lamina, the protuberances $d$ extend into or through the holes $b$ in the central lamina $a$. The other side lamina $e$ is then assembled in positions and the stamped protuberances $d$ of the first side lamina $c$, which extend through the holes $b$ in the central lamina $a$, are brought in touching contact with the second side lamina e (see Fig. 2), and the three portions or laminae of the sinker are secured together by spot welding at the positions where the first mentioned side lamina c is stamped. Thus the three parts of the sinker are homogeneously welded together to provide an exceptionally strong assembly at the rear part of the sinker, the welding process fusing together the two comparatively soft steel side laminae c, e, and entirely filling up the holes b in the central lamina a, as illustrated in Fig. 3.

Figure 4:
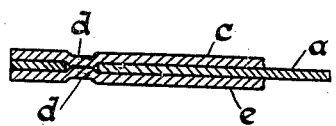
Fig. 4 is a sectional detail illustrating a modification.
Figure 5:
Fig. 5 illustrates by way of contrast the parts riveted together in accordance with the method hitherto adopted.

Assuming the thickness of the central lamina a to be .008" then the one side mild steel lamina may be stamped at the positions of the holes b in the central lamina to displace the metal at these positions to the extent of .008" and the other side lamina may be left plain or unstamped. Alternatively, each side lamina c, e, may be stamped at the position of the holes b in the central lamina a to displace the metal at these positions to the extent of .004", and in the latter arrangement the assembly of the three portions of the sinker and their correct positions prior to welding is facilitated. This modified construction is illustrated in Fig. 4. The holding together of the assembled portions during welding is of course preferably done in a suitable jig or fixture.

In the actual welding operation it is found advantageous to employ a modern type of welding machine equipped with automatic cut-outs which gives consistently uniform welds irrespective of the skill of the operator, and neatness of appearance is best obtained by employing a pointed electrode at the top and a flat one at the bottom.

After welding all that is necessary is to planish the sinker between two hardened plates, when a perfectly smooth surface results.

After securing together in the above manner the three parts of the sinker, the same may be accurately finished to size by the usual grinding and polishing processes.

It will readily be appreciated that this invention may also be applied to other loop-forming or thread controlling parts of a knitting, weaving or other textile machine of a similar laminated construction to that of a sinker as herein described, and to other parts or instruments comprising laminated portions desirably homogeneously secured together.

I claim:

1. A sinker for knitting machines, comprising at least three laminae, an inner one of which is of a hard metal having properties making it unsuitable for welding, the laminae to either side of said inner lamina being of a softer weldable metal, said hard inner lamina and at least one of said softer outer lamina interlocking to prevent their shifting relative to one another, and said softer outer laminae being united to each other by welding.

2. A sinker for knitting machines, comprising at least three laminae, an inner one of which is a hard metal having properties making it unsuitable for welding, a lamina to either side of said inner lamina being of a softer weldable metal, said hard inner lamina being provided with apertures extending completely through it from one side to the other, and at least one of said soft outer laminae being provided with protuberances extending into said apertures and welded to the other outer lamina, whereby to produce a rigidly connected laminated structure in which said apertures are completely filled by the protuberant welded metal.

3. A sinker for knitting machines, consisting of a blade of a hard metal the properties of which are impaired if subjected to a welding heat, the butt end of said blade being provided with apertures extending through it from side to side; and a lamina disposed to either side of the butt end of said blade in face to face contact therewith, said laminae being formed of a softer metal susceptible of welding without impairment of its properties, at least one of said laminae being provided with projecting portions arranged to enter said blade apertures and interlock therewith to prevent shifting between the blade and lamina, and said projecting portions being welded to the other lamina within the aperture.

GEORGE HENRY GREEN.